(12) United States Patent
Haisch

(10) Patent No.: US 9,100,030 B1
(45) Date of Patent: Aug. 4, 2015

(54) REAL-TIME MODIFICATION OF WAVEFORM CHARACTERISTICS IN ARBITRARY WAVEFORM GENERATOR

(71) Applicant: AGILENT TECHNOLOGIES, INC., Loveland, CO (US)

(72) Inventor: Hansjoerg Haisch, Loveland, CA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 14/320,469

(22) Filed: Jun. 30, 2014

(51) Int. Cl.
*H03M 1/66* (2006.01)
*H03M 7/00* (2006.01)
*G06F 1/03* (2006.01)
*G06F 1/02* (2006.01)

(52) U.S. Cl.
CPC . *H03M 7/00* (2013.01); *G06F 1/02* (2013.01); *G06F 1/022* (2013.01); *G06F 1/03* (2013.01)

(58) Field of Classification Search
CPC .............. G06F 1/02; G06F 1/03; G06F 1/022; H03M 7/00
USPC ................... 341/144, 147; 370/480; 455/450
See application file for complete search history.

(56) References Cited

U.S. PATENT DOCUMENTS

| 6,185,594 | B1 | 2/2001 | Hilton et al. |
| 6,907,081 | B2 | 6/2005 | Mantchala et al. |
| 7,071,852 | B1 * | 7/2006 | Wegener .......................... 341/61 |
| 7,535,394 | B2 * | 5/2009 | Pupalaikis .................... 341/144 |
| 7,545,304 | B1 * | 6/2009 | Wu et al. ....................... 341/144 |
| 7,714,623 | B2 * | 5/2010 | Reilly et al. .................. 327/105 |

FOREIGN PATENT DOCUMENTS

| CN | 102710316 A | 10/2012 |
| JP | 2004134953 | 4/2004 |

* cited by examiner

*Primary Examiner* — Brian Young

(57) ABSTRACT

An arbitrary waveform generator (AWG) comprises a real-time digital signal processor (DSP) configured to process a stream of waveform data based on current values of processing parameters, a DSP memory configured to store information related to the processing parameters, and an update component configured to update in real-time the current values of the processing parameters based on the information stored in the DSP memory.

26 Claims, 4 Drawing Sheets

REAL-TIME MODIFICATION OF WAVEFORM CHARACTERISTICS IN ARBITRARY WAVEFORM GENERATOR

BACKGROUND

An arbitrary waveform generator (AWG) is a form of electronic test equipment used to generate electrical waveforms with specified characteristics. Such electrical waveforms are commonly used, for instance, as test signals to evaluate the performance of electronic devices.

In one example application, an AWG generates an electrical waveform corresponding to a wireless communication signal. It then transmits the signal to a wireless device under test (DUT), which is monitored to determine whether it processes the signal properly. When generating the electrical waveform, the AWG may attempt to simulate real-world conditions in order to provide a rigorous test of the DUT's performance. Such real-world conditions may be simulated, for instance, by introducing, to the electrical waveform, impairments such as distortion, noise, or echoes. Accordingly, the monitoring of the DUT may include determining whether the DUT correctly recognizes the original electrical waveform in the presence of these impairments.

In a conventional AWG, the electrical waveform is synthesized off-line and then loaded into a memory of the AWG. Thereafter, when a test is performed, the AWG simply processes and outputs the pre-synthesized signal through defined channels. FIG. 1 is a diagram illustrating an example of such a conventional AWG.

Referring to FIG. 1, an AWG 100 comprises a digital waveform memory 105 and a plurality of digital-to-analog converters (DACs) 110. Digital waveform memory 105 receives and stores a digital waveform synthesized by a software program 115, which is typically implemented on a platform independent of AWG 100.

During typical usage, a user defines the digital waveform in software program 115, which may reside in a personal computer (PC), for example. The user then downloads the digital waveform from software program 115 to AWG 100, where it is stored in digital waveform memory 105. Subsequently, the user may control AWG 100 to convert the digital waveform into an analog waveform, which may be accomplished by outputting the digital waveform from memory 105 to DACs 110 and then performing digital-to-analog conversion with DACs 110. The analog waveform may then be transmitted to a DUT, either wirelessly or through wired connections.

The digital waveform typically comprises a plurality of time-dependent digital values representing voltages of the waveform. For instance, a digital waveform having a duration of 1 microsecond and a sample rate of 1 sample per 16 picoseconds may comprise 62.5k digital values each representing a voltage. The voltages may be defined by software program 115 to correspond to any arbitrary signal property, e.g., a high level, a low level, a rise time, an overshoot, an undershoot, etc.

The digital waveform may be designed and/or modified arbitrarily by a user with the aid of tools provided within software program 115. However, such design and/or modification must occur off-line. In other words, once the digital waveform is stored in digital waveform memory 105 of AWG 100, it remains fixed and static during generation of the analog waveform. Accordingly, any further modification of waveform characteristics requires another round of off-line re-synthesis of the digital waveform and downloading into digital waveform memory 105, which can take a significant amount of time.

Depending on download speed, waveform length, and/or memory depth of AWG 100, the download process may take a long time. Consequently, it may be prohibitively costly to generate different digital waveforms for a variety of different conditions, such as varying signal impediments (e.g., noise, echo, distortion), modulation formats, etc., due to the need to repeatedly perform the off-line re-synthesis.

SUMMARY

In a representative embodiment, an AWG comprises a real-time digital signal processor (DSP) configured to process a stream of waveform data based on current values of processing parameters, a DSP memory configured to store information related to the processing parameters, and an update component configured to update in real-time the current values of the processing parameters based on the information stored in the DSP memory.

In another representative embodiment, a method of operating an AWG comprises operating a real-time DSP to process a stream of waveform data based on current values of processing parameters, operating a DSP memory to store information related to the processing parameters, and operating an update component to update in real-time the current values of the processing parameters based on the information stored in the DSP memory.

BRIEF DESCRIPTION OF THE DRAWINGS

The described embodiments are best understood from the following detailed description when read with the accompanying drawing figures. Wherever applicable and practical, like reference numerals refer to like elements.

DETAILED DESCRIPTION

Figure 1:
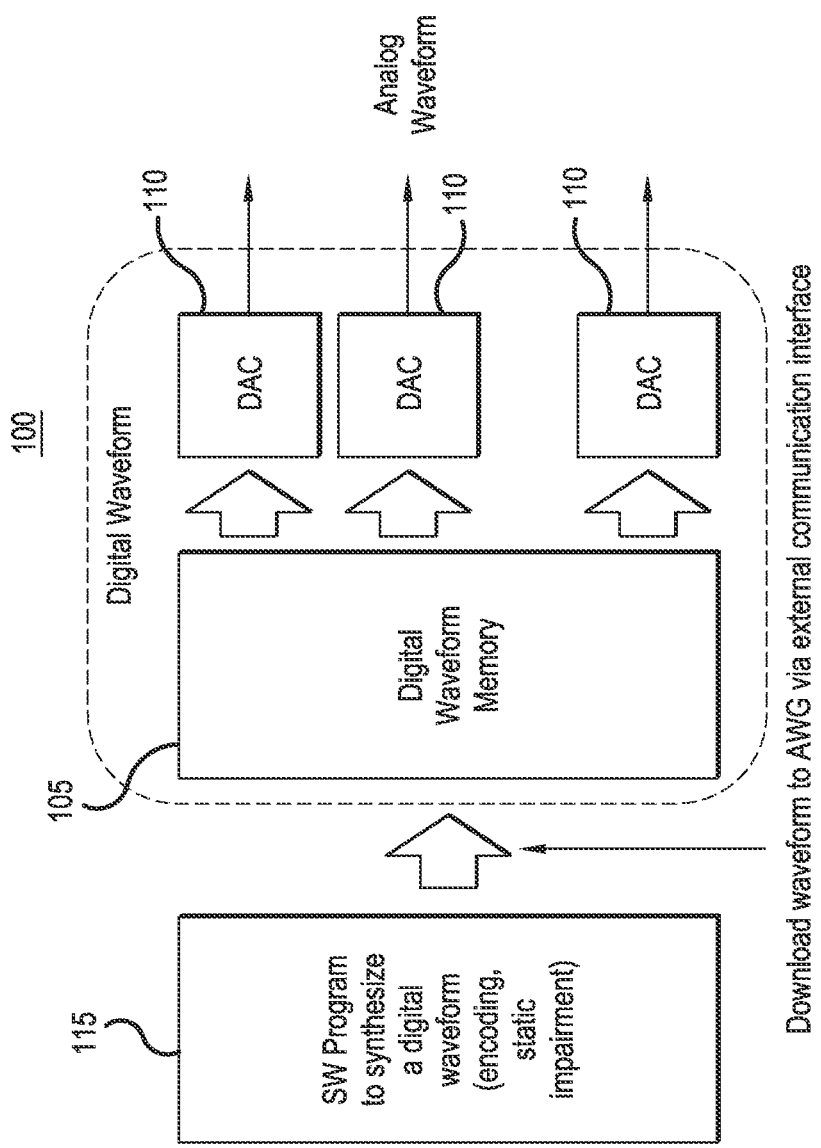
FIG. 1 is a block diagram of a conventional AWG.

In the following detailed description, for purposes of explanation and not limitation, representative embodiments disclosing specific details are set forth in order to provide a thorough understanding of the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only, and is not intended to be limiting. The defined terms are in addition to the technical and scientific meanings of the defined terms as commonly understood and accepted in the technical field of the present teachings.

As used in the specification and appended claims, the terms 'a', 'an' and 'the' include both singular and plural referents, unless the context clearly dictates otherwise. Thus, for example, 'a device' includes one device and plural devices.

As used in the specification and appended claims, and in addition to their ordinary meanings, the terms 'substantial' or 'substantially' mean to within acceptable limits or degree.

As used in the specification and the appended claims and in addition to its ordinary meaning, the term 'approximately' means to within an acceptable limit or amount to one having ordinary skill in the art. For example, 'approximately the same' means that one of ordinary skill in the art would consider the items being compared to be the same.

The described embodiments relate generally to AWGs and related methods of operation. In certain embodiments, an electrical waveform is synthesized and/or modified on-line and in real-time. The synthesis and/or modification of the waveform in this manner avoids certain shortcomings associated with the off-line pre-processing of synthesized waveforms, such as delays it may impose on a testing process. It may also allow the described AWGs to generate electrical waveforms with impairments that vary over time as in real-world situations. For example, it may allow an AWG to generate a waveform with impairments that vary in a manner similar to a communication signal transmitted to or from a mobile phone within a moving vehicle.

In the described embodiments, an AWG may perform real-time processing of an electrical waveform in various ways, such as encoding it in a desired modulation format (e.g., polarization multiplexed quadrature amplitude modulation [QAM] 64 for optical digital coherent transmission), or adding impairments, such as polarization rotation or phase noise. These and other modifications can generally be accomplished by changing the processing coefficients of a DSP used to perform the relevant functions. Such modifications can be made according to user demand or test requirements, for example.

Figure 2:
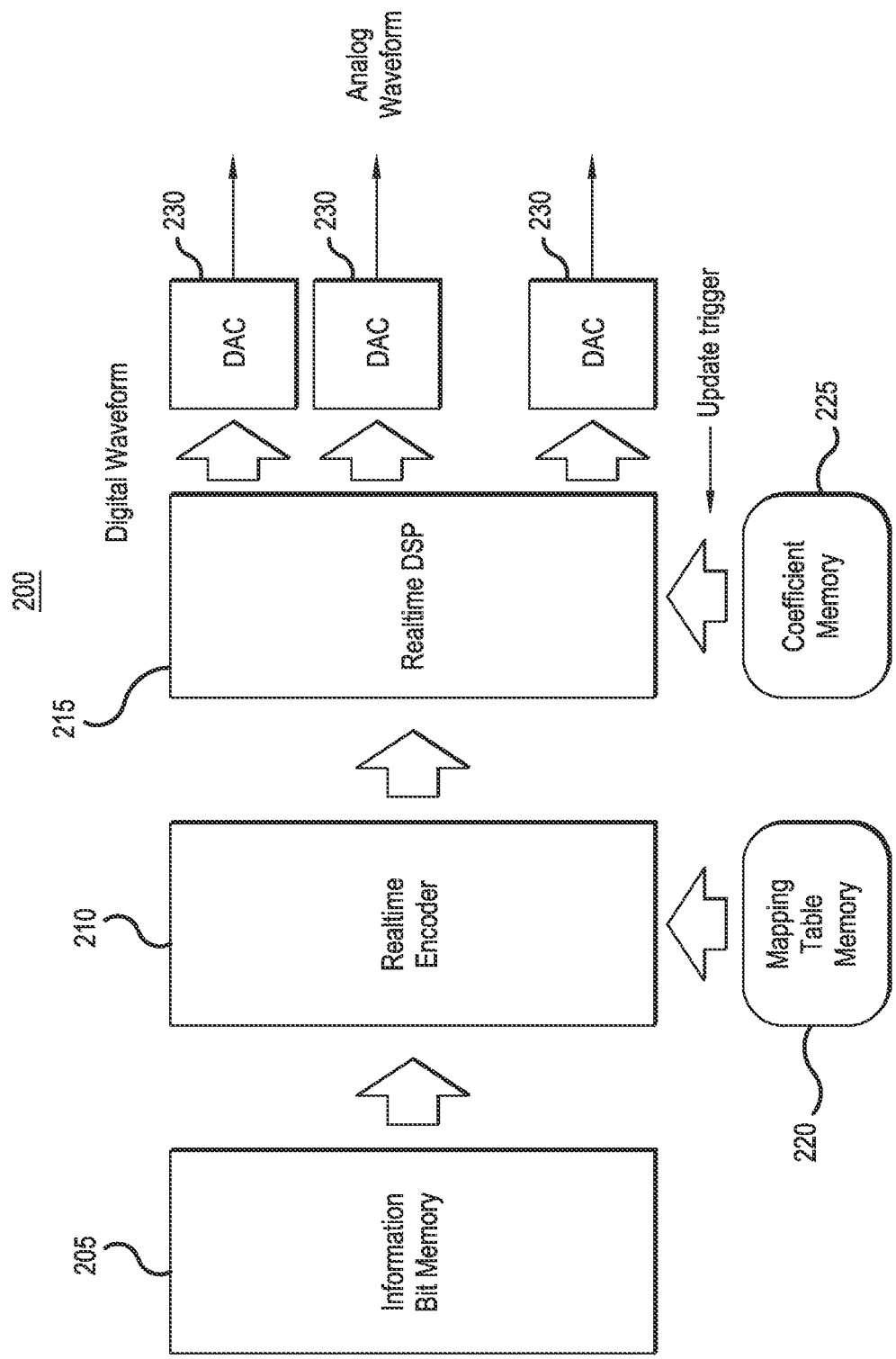
FIG. 2 is a block diagram of an AWG according to a representative embodiment.

FIG. 2 is a block diagram of an AWG 200 according to a representative embodiment. AWG 200 is configured to provide both real-time encoding and real-time modification of an electrical waveform stored in memory.

In general, the features illustrated in FIG. 2 may be implemented in a single integrated circuit (IC) chip, multiple IC chips, and/or other accompanying features. In certain embodiments, for example, the features illustrated in FIG. 2 may be implemented in a single custom application specific IC (ASIC) or a field programmable gate array (FPGA). AWG 200 may further comprise various features not specifically illustrated in FIG. 2, such as interfaces for receiving and/or transmitting data, transmission components for outputting a generated waveform in a wired or wireless manner, and others.

In some embodiments, AWG 200 is implemented from DACs that are provided as pre-designed macro block(s), together with additional signal processing circuitry designed as additional macro block(s) to function in combination with the DACs. In such implementations, the additional signal processing circuitry typically resides in the signal flow prior to the DACs.

AWG 200 may be used in any suitable application that relies on the generation of electrical waveforms. In some embodiments, for instance, it may be used to generate electrical waveforms with variable encoding formats and impairments that evolve over time. Some embodiments are described below with reference to radio frequency (RF) or optical signals, but the described concepts are not limited thereto.

Referring to FIG. 2, AWG 200 comprises an information bit memory 205, a real-time encoder 210, a real-time DSP 215, a mapping table memory 220, a coefficient memory 225, and a plurality of DACs 230.

Information bit memory 205 stores information representing at least one electrical waveform to be processed and output by AWG 200. This information may comprise, for instance, a sequence of samples (e.g., groups of bits) representing time-varying voltages. Alternatively, it could comprise coefficients or some other encoded representation of an electrical waveform. The at least one electrical waveform may be synthesized off-line by a user, e.g., in a PC, and then loaded into AWG 200. Alternatively, it could be generated on-the-fly within AWG 200. The at least one electrical waveform may also comprise at least one pre-defined electrical waveform corresponding to standardized test signals.

The information stored in information bit memory 205 may be, for instance, various forms of user data or program data such as test bit sequences, pseudo-random bit sequences, real information bits comprising text or video, etc. During typical operation of AWG 200, this information may be transferred from information bit memory 205 in a streaming manner.

Real-time encoder 210 receives information stored in information bit memory 205 (e.g., a sequence of samples) and performs real-time encoding on the received information. Such encoding may comprise, for instance, upconversion of a baseband signal to an RF signal and/or conversion of the signal into symbols in a desired modulation format, such as QAM 64.

The encoding is performed according to certain parameters having values that can be modified based on information stored in mapping table memory 220. Such parameters may comprise, for instance, coefficient values or formatting specifications for different types of modulation. Moreover, the parameter values may be modified in real-time during operation of AWG 200 by transferring information from mapping table memory 220 to real-time encoder 210, typically in response to an update trigger and/or one or more user inputs. One possible way to modify the parameter values, for example, is to load updated information from real-time encoder 210 into registers within real-time encoder 210.

The encoded waveform is transferred from real-time encoder 210 to real-time DSP 215, typically in the form of a streaming digital waveform. Real-time DSP 215 then performs various signal processing functions on the received waveform, typically using digital multipliers and digital delay elements realizing a digital filter, phase and amplitude modulator, nonlinear equalizer, etc. The multipliers and/or other features of real-time DSP 215 may operate according to coefficients or other parameter values that may be either static or dynamically modifiable. The dynamic modification of such parameter values may alter the signal processing operations of real-time DSP 215 in real-time.

Dynamic modification of the coefficients may be accomplished, for instance, by storing the coefficients in coefficient memory 225 and then loading them into real-time DSP 215 according to the update trigger. This loading can be performed very fast or at a defined rate as part of a modulation or impairment generation application.

After processing the encoded waveform, real-time DSP 215 outputs the processed and encoded waveform to DACs 230 as a streaming digital waveform. DACs 230 convert the streaming digital waveform into an analog waveform, which is then transmitted to a DUT. In general, the transmission may be accomplished in a wired or wireless manner, and such transmission may be performed through the use of transmission components known to those skilled in the art.

The DUT receives and processes the analog waveform, typically subject to monitoring and analysis in a test procedure. Prior to processing the received analog waveform, however, the DUT typically performs some operations complementary to those performed by AWG 200. For instance, the DUT typically performs functions to digitize the analog waveform, handle any impairments introduced by real-time DSP 215, and decode and/or downconvert the waveform.

Figure 3:
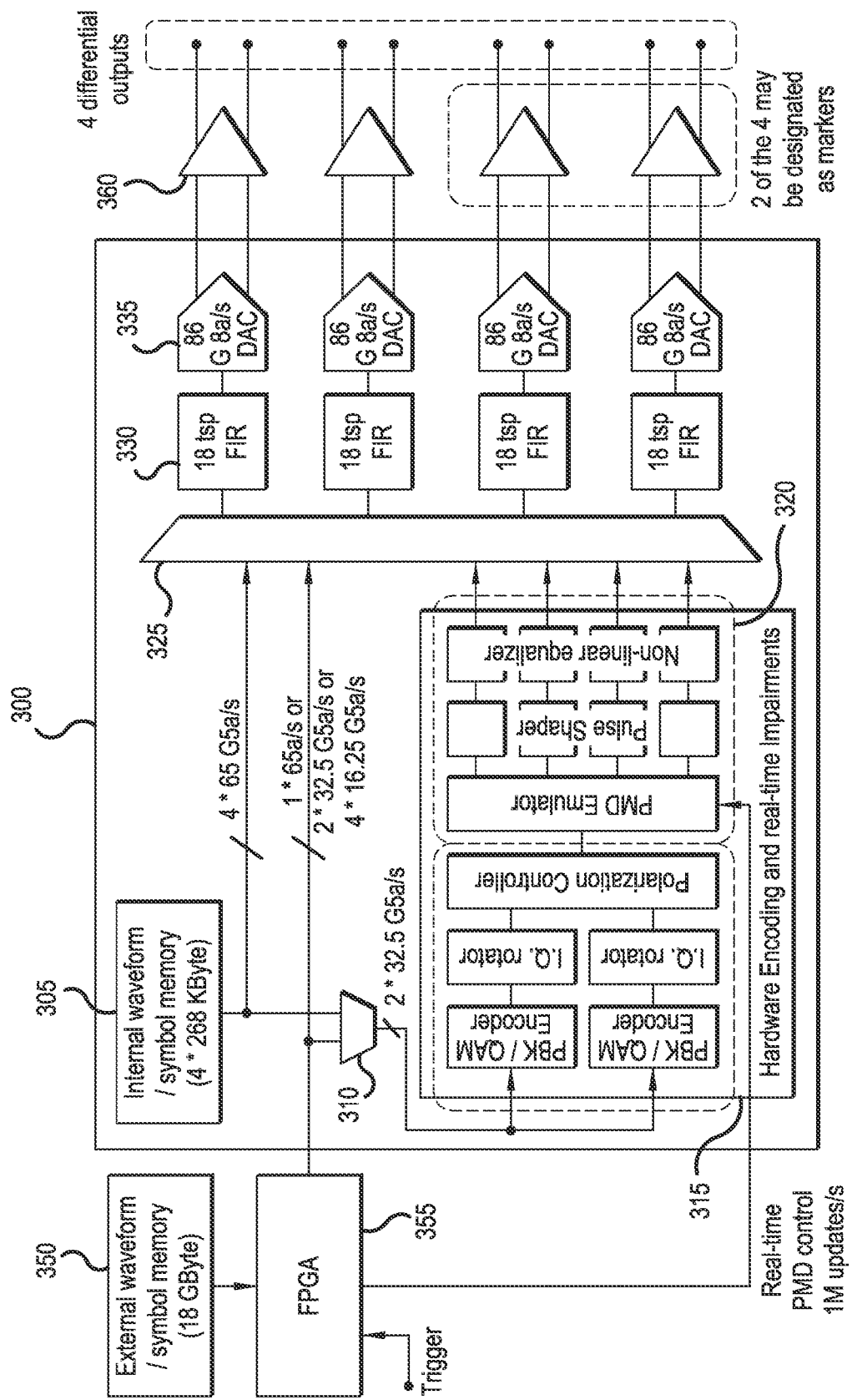
FIG. 3 is a block diagram of an AWG according to another representative embodiment.

FIG. 3 is a block diagram of an AWG 300 according to another representative embodiment. AWG 300 is a variation of AWG 200, and is presented in order to show certain alternative features that may be included therein, including certain detailed implementations of features shown in FIG. 2.

Referring to FIG. 3, AWG 300 comprises an internal waveform memory 305, a multiplexer 310, a real-time encoder 315, a real-time DSP 320, a switch fabric 325, output filters 330, and DACs 335. These features are connected to an external waveform memory 350, an FPGA 355, and output buffers 360.

Internal waveform memory 305 stores a synthesized waveform to be processed and output by AWG 300, and external waveform memory 350 stores additional waveform data that can be used to modify or replace the synthesized waveform stored by internal waveform memory 305. The synthesized waveform may comprise, for instance, a baseband signal to be processed and then output as a test signal, and the additional waveform data may comprise, for instance, impairments to be added to the baseband signal for testing purposes.

The additional waveform data is provided to AWG 300 via FPGA 355, which operates responsive to a trigger. The trigger may be used to control both the provision of additional waveform data to AWG 300, and the performance of signal processing operations by real-time encoder 315 and real-time DSP 320. For instance, the trigger may control real-time encoder 315 to perform periodic updates (e.g., 1M updates/s) on polarization mode dispersion (PMD) noise inserted into the synthesized waveform.

Multiplexer 310 operates to provide both the synthesized waveform of internal waveform memory 305 and the additional waveform data of external waveform memory 350 to real-time encoder 315 and real-time DSP 320.

Switch fabric 325 receives the synthesized waveform of internal waveform memory 305, the additional waveform data of external waveform memory 350, and the processed waveform from real-time DSP 320. It outputs the received information as four streaming digital waveforms to output filters 330, which are 16 tap finite impulse response (FIR) filters in the illustrated example. Output filters 330 filter the streaming digital waveforms, and they transmit the filtered waveforms to DACs 335. DACs 335 then convert the filtered waveforms into analog waveforms in the form of differential signals, and output buffers 360 receive and transmit the differential signals away from AWG 300. Among the differential signals transmitted by output buffers 360, some signals may be designated as markers. For instance, in the illustrated example, 2 of 4 differential signals are designated as markers. In this example, the markers are output signals with a defined timing relationship to the output waveform which can mark individual samples of the waveform or synchronize to portions of the waveform.

Figure 4:
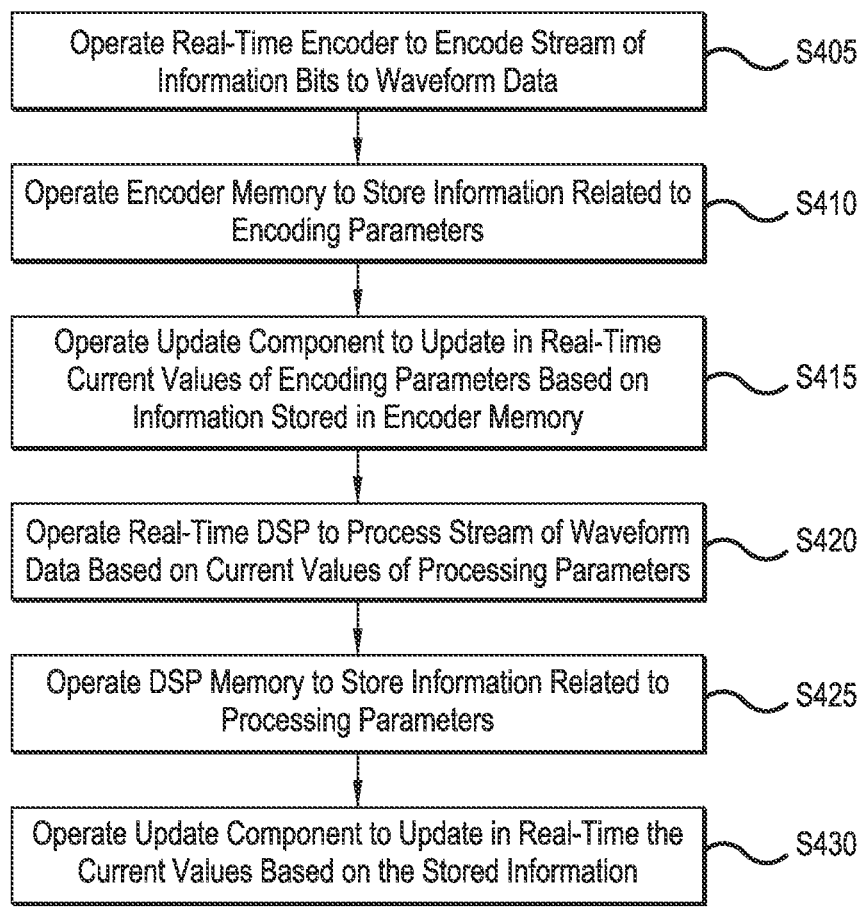
FIG. 4 is a flowchart illustrating a method of operating an AWG according to a representative embodiment.

FIG. 4 is a flowchart illustrating a method of operating an AWG according to a representative embodiment. The illustrated method could be used, for instance, to operate AWG 200 or 300, although it is not limited thereto.

Referring to FIG. 4, the method comprises operating a real-time encoder to encode a stream of information bits to waveform data in accordance with current values of encoding parameters (S405), operating an encoder memory to store information related to the encoding parameters (S410), and further operating the update component to update in real-time the current values of the encoding parameters based on the information stored in the encoder memory (S415). These operations may be performed, for instance, by real-time encoder 210 and mapping table memory 220, in combination with other features, as illustrated in FIG. 2. Alternatively, these operations may be performed, for instance, by real-time encoder 315, internal waveform memory 305, external waveform memory 350, and FPGA 355, in combination with other features, as illustrated in FIG. 3.

The method further comprises operating a real-time DSP to process a stream of waveform data based on current values of processing parameters (S420), operating a DSP memory to store information related to the processing parameters (S425), and operating an update component to update in real-time the current values of the processing parameters based on the information stored in the DSP memory (S430). These operations may be performed, for instance, by real-time DSP 215 and coefficient memory 225, in combination with other features, as illustrated in FIG. 2. Alternatively, these operations may be performed, for instance, by real-time DSP 320, internal waveform memory 305, external waveform memory 350, and FPGA 355, in combination with other features, as illustrated in FIG. 3.

In the illustrated method, the real-time encoder may generate waveform data by encoding the information bits in a modulated format, such as an RF or optical transmission format. The real-time DSP may process the stream of waveform data to introduce or modify impairments (e.g., polarization rotation or phase noise) in the stream of waveform data, as explained above with reference to FIGS. 2 and 3. Moreover, the update component may update in real-time the current DSP coefficient values to change the impairments to be introduced or modified by the real-time DSP. For instance, it may control the impairments to evolve over time as a simulation of real-world conditions. The real-time DSP may comprise, for instance, a plurality of digital multipliers and digital delay elements, and the current processing parameter values comprise coefficients that govern operation of the multipliers or digital delay elements.

While representative embodiments are disclosed herein, one of ordinary skill in the art appreciates that many variations that are in accordance with the present teachings are possible and remain within the scope of the appended claim set. The invention therefore is not to be restricted except within the scope of the appended claims.

The invention claimed is:

1. An arbitrary waveform generator (AWG), comprising:
   a real-time digital signal processor (DSP) configured to process a stream of waveform data based on current values of processing parameters;
   a DSP memory configured to store information related to the processing parameters; and
   an update component configured to update in real-time the current values of the processing parameters based on the information stored in the DSP memory, wherein the real-time DSP comprises a plurality of digital multipliers and digital delay elements, and the current processing parameter values comprise coefficients that govern operation of the multipliers or digital delay elements.

2. The AWG of claim 1, further comprising:
   a real-time encoder configured to encode information bits in accordance with current values of encoding parameters to produce the stream of waveform data; and
   an encoder memory configured to store information related to the encoding parameters, wherein the update component is further configured to update in real-time the current values of the encoding parameters based on the information stored in the encoder memory.

3. The AWG of claim 2, wherein the real-time encoder encodes the information bits in a modulated format.

4. The AWG of claim 3, wherein the modulated format is a radio frequency or optical transmission format.

5. The AWG of claim 1, wherein the real-time DSP processes the stream of waveform data to introduce or modify impairments in the stream of waveform data.

6. The AWG of claim 5, wherein the impairments comprise polarization rotation or phase noise.

7. The AWG of claim 5, wherein the update component updates in real-time the current values to change the impairments to be introduced or modified by the real-time DSP.

8. The AWG of claim 1, wherein the stream of waveform data comprises a synthesized waveform stored in the AWG.

9. The AWG of claim 1, wherein the real-time DSP comprises a plurality of digital multipliers and digital delay elements, and the current processing parameter values comprise coefficients that govern operation of the multipliers or digital delay elements.

10. The AWG of claim 1, wherein the update component updates coefficients stored in the DSP memory and loads the updated coefficients to the real-time DSP in real time.

11. A method of operating an arbitrary waveform generator (AWG), comprising:
    operating a real-time digital signal processor (DSP) to process a stream of waveform data based on current values of processing parameters;
    operating a DSP memory to store information related to the processing parameters; and
    operating an update component to update in real-time the current values of the processing parameters based on the information stored in the DSP memory wherein the real-time DSP comprises a plurality of digital multipliers and digital delay elements, and the current processing parameter values comprise coefficients that govern operation of the multipliers or digital delay elements.

12. The method of claim 11, further comprising:
    operating a real-time encoder to encode information bits in accordance with current values of encoding parameters to produce the stream of waveform data; and
    operating an encoder memory configured to store information related to the encoding parameters; and
    further operating the update component to update in real-time the current values of the encoding parameters based on the information stored in the encoder memory.

13. The method of claim 12, wherein the real-time encoder encodes the information bits in a modulated format.

14. The method of claim 13, wherein the modulated format is a radio frequency or optical transmission format.

15. The method of claim 11, wherein the real-time DSP processes the stream of waveform data to introduce or modify impairments in the stream of waveform data.

16. The method of claim 15, wherein the impairments comprise polarization rotation or phase noise.

17. The method of claim 16, wherein the update component updates in real-time the current values to change the impairments to be introduced or modified by the real-time DSP.

18. The method of claim 11, wherein the stream of waveform data comprises a synthesized waveform stored in the AWG.

19. An arbitrary waveform generator (AWG), comprising:
    a real-time digital signal processor (DSP) configured to process a stream of waveform data based on current values of processing parameters;
    a DSP memory configured to store information related to the processing parameters;
    an update component configured to update in real-time the current values of the processing parameters based on the information stored in the DSP memory;
    a real-time encoder configured to encode information bits in accordance with current values of encoding parameters to produce the stream of waveform data; and
    an encoder memory configured to store information related to the encoding parameters, wherein the update component is further configured to update in real-time the current values of the encoding parameters based on the information stored in the encoder memory.

20. The AWG of claim 19, wherein the real-time encoder encodes the information bits in a modulated format.

21. The AWG of claim 20, wherein the modulated format is a radio frequency or optical transmission format.

22. The AWG of claim 19, wherein the real-time DSP processes the stream of waveform data to introduce or modify impairments in the stream of waveform data.

23. The AWG of claim 22, wherein the impairments comprise polarization rotation or phase noise.

24. The AWG of claim 22, wherein the update component updates in real-time the current values to change the impairments to be introduced or modified by the real-time DSP.

25. The AWG of claim 19, wherein the stream of waveform data comprises a synthesized waveform stored in the AWG.

26. The AWG of claim 19, wherein the real-time DSP comprises a plurality of digital multipliers and digital delay elements, and the current processing parameter values comprise coefficients that govern operation of the multipliers or digital delay elements.

* * * * *